United States Patent Office 2,731,348
Patented Jan. 17, 1956

2,731,348
SILAGE ADDITIVE

Alvin J. Striegel, Shimerville, and Franklin B. Wells, Allentown, Pa., assignors to Trojan Powder Company, a corporation of New York No Drawing. Application August 21, 1953,
Serial No. 375,823

5 Claims. (Cl. 99—8)

This invention relates to the preservation of silage. More particularly it relates to an additive which improves the quality of silage by suppressing undesirable and accelerating desirable bacteriological and chemical changes and adding valuable utilizable nitrogen compounds.

Briefly stated, the invention comprises mixed calcium formate and amino acid as an additive for silage.

Calcium formate has long been known to be a silage preservative, although the complete reasons for its efficiency appear not to have been fully understood.

Attempts have been made to improve the protein value of silage through the addition of amino acids. No commercial success has attended these attempts; the amino acids are decomposed by various organisms to ammonia and other products of decomposition.

Lactobacilli, by contrast, result indirectly in preserving the amino acids. But such bacilli are rather slow in becoming active and this slowness in silage allows other microorganisms to become active and abundant before the lactobacilli dominate the action. This means that the microorganisms which cause degradation of the amino acids to ammonia may destroy much of the amino acids long before lactobacilli activity establishes a low pH, due to lactic acid formed, and so protects the amino acids. When the pH drops below 4.5, as to a value of 4.2 or even less, either through natural process of fermentation or through the artificial addition of acids, then butyric acid formation and ammonia formation are both repressed while lactic acid formation is favored along with the preservation of amino acids.

The lactic acid, produced in the fermentation of the silage, reacts with the calcium formate of our additive, to form calcium lactate and formic acid. The formic acid contributes to low pH and retarding of the growth and activity of microorganisms destructive to amino acids.

We have found that simultaneous addition of the amino acids and calcium formate prevents serious degradation of the added amino acids, as shown by absence of ammonia and of more than a trace of ammonium salts in the resultant silage.

By adding also, to calcium formate and amino acid additive, materials which suppress the development of undesirable bacteria but which do not suppress equally the development of lactic acid bacilli, we obtain additional advantage. Particularly satisfactory materials for this purpose are the nitrites of the alkali and alkaline earth metals, the nitrites suppressing microorganisms that attack amino acids.

As to the materials, we use an amino acid of the food or protein type which is necessarily non-toxic. Examples are protein hydrolysates. Such hydrolysates are commercial products made by acid or other hydrolytic agents acting upon commercial feed proteins. Also we may use separately or mixed any one of the following amino acids: alanine, aspartic acid, glutamic acid, lysine, methionine, phenylalanine, threonine, tyrosine and tryptophane.

The calcium formate used may be technical or of higher grade. When nitrite is used, it is introduced in the form of sodium nitrite. There is no advantage in other soluble nitrites, such as potassium, lithium or calcium, which offset the higher cost of these other nitrites.

As to proportions, the calcium formate is used in amount greater than that of the amino acid or of nitrite. There is no necessity of using larger proportions of the amino acids; such larger proportions are justified only in case the extra cost of the amino acid is offset by the increased nutritional value of the additional proportion of the acid. In general we use 2%–20% of the amino acid on the weight of the calcium formate, on the dry basis. When a nitrite is also incorporated, the proportion of it is 1%–15% of the weight of the formate.

The additive is introduced into the silage in any convenient manner. Thus, the additive may be applied in the form of a milled dry mixture to the green silage at the cutter stage or may be spread or sprayed on the silage at this stage or in the silo itself, as the silo is being filled, the additive if sprayed being in the form of an aqueous solution.

The proportion of the additive incorporated into the silage is ordinarily 4–15 pounds of the total additive mix per ton of the green silage, the proportion of the additive being smaller within this range when the green silage is low in protein or high in sugars and the proportion of the additive being larger, that is, nearer the top of the range 4–15 pounds, for silage relatively high in protein. Examples of proportions for a silage additive containing 75% calcium formate, 10% of amino acids, and 15% of wood flour are as follows: 5 lbs. of the additive for a ton of green corn silage, 8 lbs. for crimson clover, and 10 lbs. for alfalfa.

To facilitate the incorporation of the amino acid in the very low proportion which is adequate, the amino acid may be mixed or absorbed in advance in an inert carrier. An economical and satisfactory carrier for the amino acid is wood flour, the amino acid being milled into the wood flour or introduced in the form of an aqueous solution into the flour. A suitable proportion of the amino acid to carrier is 10–100 parts of the amino acid for 100 parts of the carrier. Other carriers that may be used in like manner and proportions are corn meal, alfalfa meal, ground wheat and soybean meal.

The invention will be further illustrated by description in connection with the following specific examples. In these examples and elsewhere herein proportions are expressed as parts by weight.

Example 1

Calcium formate and dried hydrolysate of soybean protein (made by acid hydrolysis) are mixed and milled together in the proportion of 5 parts of the hydrolysate to 100 parts of calcium formate, both calculated on the dry basis. The additive so made is then fed upon green corn fodder at the stage of moving on the belt of the silage cutter to the cutting knives, the silage additive being fed in the proportion of 5 pounds of the mixed formate and hydrolysate to 1 ton green weight of the fodder and the equipment used being conventional.

The ensilage so prepared is packed into a silo in the usual manner.

The calcium formate serves first to preserve the amino acids during the early stages of fermentation of silage in an as yet undetermined manner. It then undergoes reaction with the lactic acid formed during fermentation to liberate formic acid. As a result, the pH falls to such a level as to preserve the amino acids. Thus calcium formate acts to prevent destruction of the added amino acids, first, unexpectedly, as a preservative thereof and later through liberation of formic acid to lower the pH of the silage.

Example 2

The procedure of Example 1 is followed except that the protein hydrolysate, used in Example 1 as the source of amino acids, is replaced by any one of the following amino acids: alanine, aspartic acid, glutamic acid, lysine, methionine, phenylalanine, threonine, tyrosine and tryptophane, or a mixture of any two or more of these individual amino acids. The proportion of total amino acid used is kept the same as the proportion of the hydrolysate on the dry basis in Example 1.

Example 3

The procedure of either Examples 1 or 2 is followed with the addition of sodium nitrite to the mixture being mixed or milled to make the additive, the sodium nitrite being used in the proportion of 10 parts for 100 parts of the calcium formate.

Example 4

The procedure of Examples 1, 2, or 3 above is followed, except that the corn fodder there used is replaced by alfalfa, clover, or other usual silage material.

It will be understood that it is intended to cover all changes and modifications of the examples of the invention herein chosen for the purpose of illustration which do not constitute departures from the spirit and scope of the invention.

What we claim is:

1. A silage preservative comprising a mixture of calcium formate and a food amino acid, the proportion of the formate being in excess of that of the amino acid.
2. A silage preservative comprising a mixture of calcium formate and a food amino acid, the proportion of the formate being in excess of that of the amino acid and the amino acid component including at least one of the amino acids selected from the group comprising alanine, aspartic acid, glutamic acid, lysine, methionine, phenylalanine, threonine, tyrosine, and tryptophane.
3. A silage preservative comprising calcium formate and admixed lysine, the proportion of the formate being in excess of the lysine.
4. A silage preservative comprising calcium formate, a dried solid vegetable carrier in finely divided condition, and a food amino acid impregnated into the vegetable carrier, the proportion of calcium formate being in excess of the amino acid.
5. A silage preservative comprising calcium formate, a food amino acid, and sodium nitrite, the calcium formate being used in proportion in excess of the amino acid and of the nitrite.

References Cited in the file of this patent
UNITED STATES PATENTS 2,160,167   Pfeiffer _____ May 30, 1939